(12) United States Patent
Nakaho

(10) Patent No.: US 7,324,260 B2
(45) Date of Patent: Jan. 29, 2008

(54) VARIABLE REFLECTANCE MIRROR

(75) Inventor: Junichi Nakaho, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 324 days.

(21) Appl. No.: 11/110,944

(22) Filed: Apr. 21, 2005

(65) Prior Publication Data

US 2005/0237591 A1    Oct. 27, 2005

(30) Foreign Application Priority Data

Apr. 22, 2004    (JP)    ............................. 2004-126785

(51) Int. Cl.
*G02F 1/15* (2006.01)
*G02F 1/07* (2006.01)

(52) U.S. Cl. ...................... 359/265; 359/247

(58) Field of Classification Search ................ 359/237, 359/242, 247–248, 265, 290–291
See application file for complete search history.

(56) References Cited

U.S. PATENT DOCUMENTS

| | | | |
|---|---|---|---|
| 3,521,941 A * | 7/1970 | Deb et al. .................... 359/275 |
| 3,844,636 A * | 10/1974 | Maricle et al. .............. 359/267 |
| 4,338,000 A | 7/1982 | Kamimori et al. |
| 4,465,339 A * | 8/1984 | Baucke et al. ............... 359/274 |
| 4,909,610 A * | 3/1990 | Baucke et al. ............... 359/265 |
| 5,276,547 A * | 1/1994 | Couput et al. ............... 359/270 |
| 7,088,490 B2 * | 8/2006 | Nakaho et al. .............. 359/265 |
| 2004/0233537 A1* | 11/2004 | Agrawal et al. ............. 359/604 |
| 2006/0209383 A1* | 9/2006 | Burdis et al. ................ 359/265 |

FOREIGN PATENT DOCUMENTS

GB    2 118 210 A    10/1983
JP    62-2587    1/1987

OTHER PUBLICATIONS

European Search Report dated Nov. 7, 2005.

* cited by examiner

*Primary Examiner*—Scott J. Sugarman
*Assistant Examiner*—DaWayne A. Pinkney
(74) *Attorney, Agent, or Firm*—Roberts, Mlotkowski & Hobbes; Thomas W. Cole

(57) ABSTRACT

The present invention provides a variable reflectance mirror, comprising a color layer that develops color by binding to hydrogen or lithium, a transparent substrate formed on or above one surface of the color layer, a light-reflecting layer which allows transmission of hydrogen or lithium provided on the side of the color layer opposite to the surface thereof on which the transparent substrate is formed, and a supplying device for supplying hydrogen or lithium to the color layer, wherein a transparent intermediate layer which allows transmission of hydrogen or lithium and having a refractive index smaller than that of the color layer is formed between the color layer and the light-reflecting layer.

14 Claims, 7 Drawing Sheets

VARIABLE REFLECTANCE MIRROR

CROSS-REFERENCE TO RELATED APPLICATION

This application claims priority under 35 USC 119 from Japanese Patent Application No.2004-126785, the disclosure of which is incorporated by reference herein.

BACKGROUND OF THE INVENTION

1. Field of Invention

The present invention relates to a variable reflectance mirror that changes its reflectance by developing and fading color of a color layer provided on the side of a light-reflecting layer thereof electrically, or by hydrogen-containing gas or the like.

2. Description of the Related Art

Variable reflectance mirrors, that change their reflectance by electrically coloring color layers formed on surfaces of light-reflecting layers, has been conventionally known (e.g., Japanese Utility Model Application Publication (JP-Y) No. 62-2587).

In the variable reflectance mirror disclosed in JP-Y No. 62-2587, thin layers consisting of a transparent electrode, hydroxide iridium ($Ir(OH)_3$) layer, tantalum pentoxide ($Ta_2O_5$) layer, tungsten trioxide ($WO_3$) layer, and an aluminum (Al) electrode, are formed (laminated) in this order on a rear surface of a glass substrate by means of, for example, a vacuum deposition. In the variable reflectance mirror, when a voltage is applied between the transparent electrode and the aluminum electrode, the iridium hydroxide layer and the tungsten trioxide layer undergo a coloring reaction, thereby resulting in change of a reflectance of the mirror.

However, in some cases, a variable reflectance mirror having the above-described configuration once colored can not be restored to the decolored condition, if thickness and qualities of respective thin layers described above are not well balanced. Further, because fluctuation in thickness of the layers significantly affects properties of the mirror, such mirrors require difficult manufacturing conditions and thus increase in production cost due to use of vacuum deposition or the like for production of the multilayer films.

In view of overcoming these problems, a variable reflectance mirror with a simpler configuration having only two layers on a rear surface of a glass substrate has been proposed.

As shown in FIG. 6, in the variable reflectance mirror 100, a tungsten trioxide color layer 104 that develops color by binding to hydrogen or lithium is formed on a rear surface of a glass substrate 102, and a light-reflecting rhodium layer 106 that allows permeation of hydrogen or lithium is formed on a side of the color layer 104 that is opposite to side on which the glass substrate 102 is formed. In addition, the variable reflectance mirror 100 has a supplying device (not shown) that supplies hydrogen or lithium to the color layer 104.

In the variable reflectance mirror 100, when hydrogen or lithium is supplied to the color layer 104 by the supplying device, the color layer 104 develops color by binding to hydrogen or lithium. As a result, the light that enters from the surface of the glass substrate 102 (top surface in FIG. 6) into the glass substrate 102 and is reflected by the light-reflecting layer 106 becomes reduced in intensity while passing through the colored color layer 104, resulting in decrease in reflectance.

The variable reflectance mirror 100 having the configuration above should have theoretically a high reflectance of 63% when the color layer 104 has been decolored, if the color layer 104 is made of tungsten trioxide and the light-reflecting layer 106 of rhodium as described above.

However, in reality when the tungsten trioxide color layer 104 is formed, for example, by vacuum deposition, sol-gel, or other method, the surface 108 becomes uneven and part of the rhodium light-reflecting layer 106 becomes overlapping with the color layer in the irregularities as shown in FIG. 6. It has been theoretically confirmed that the presence of such irregularities at the interface between the two layers makes the interface indistinct and thus reduces the reflectance of the mirror when the color layer 104 has been decolored. In addition, an increase in the depth (h) of interface irregularities leads to drastic decrease in reflectance.

For example, when a tungsten trioxide color layer 104 having a thickness of 500 nm is formed by vacuum deposition, the depth h of the irregularities becomes 10 to 20 nm; and in such a case, it has been confirmed that the reflectance decreases by tens of % to 50% or less as shown in FIG. 7.

SUMMARY OF THE INVENTION

The present invention, which was made in consideration of the circumstances above, provides a variable reflectance mirror allowing prevention of or control of the deterioration in the reflectance when the color layer has been decolored.

Namely, the invention provides a variable reflectance mirror having: a color layer that can develop color by binding with hydrogen or lithium; a transparent substrate formed on or above one surface of the color layer; a light-reflecting layer formed on the side of the color layer opposite to the surface thereof on which the transparent substrate is formed, which allows transmission of hydrogen or lithium; and a supplying device for supplying hydrogen or lithium to the color layer, wherein a transparent intermediate layer, which allows transmission of hydrogen or lithium and having a refractive index smaller than that of the color layer, is formed between the color layer and the light-reflecting layer.

In the variable reflectance mirror, when hydrogen or lithium is supplied to the color layer by the supplying device, the color layer develops color by binding to the hydrogen or lithium. As a result, the light that enters from the surface of the transparent substrate into the transparent substrate and is reflected by the light-reflecting layer is reduced in intensity while passing through the colored color layer, altering the reflectance of the variable reflectance mirror and making it exert an anti-glare effect.

In the variable reflectance mirror, a transparent intermediate layer having a refractive index smaller than that of the color layer is formed between the color layer and the light-reflecting layer. Accordingly, even when there are irregularities on the surface of the color layer facing the light-reflecting layer (at the interface between the color layer and the intermediate layer) and/or on the surface of light-reflecting layer facing the color layer (at the interface between the intermediate layer and light-reflecting layer), the boundary between the color layer and the light-reflecting layer becomes distinct, allowing prevention or control of the deterioration in the reflectance when the color layer has been decolored.

Further, the invention provides the variable reflectance mirror, in that the material used for the intermediate layer is selected from the group consisting of silicon dioxide, magnesium fluoride, lithium fluoride, and calcium fluoride.

In the variable reflectance mirror, the material used for the intermediate layer is favorably selected from the group consisting of silicon dioxide, magnesium fluoride, lithium fluoride, and calcium fluoride.

Furthermore, the invention provides the variable reflectance mirror, in that the thickness of the intermediate layer is 100 nm or less.

The thickness of the intermediate layer is the minimum distance between the color layer and the light-reflecting layer (the distance in the thickness direction of the transparent substrate between the summit of the irregularities of color layer surface and the summit of the irregularities of the surface of the light-reflecting layer).

The thickness of the intermediate layer of the variable reflectance mirror is defined as 100 nm or less. Such a variable reflectance mirror is favorable as it does not generate interference color.

As described above, the variable reflectance mirror according to the invention allows prevention or control of the deterioration in the reflectance when the color layer has been decolored.

BRIEF DESERIPTION OF THE DRAWINGS

Preferable embodiments of the present invention will be described in detail based on the following figures.

DETAILED DESCRIPTION OF THE INVENTION

Figure 1:
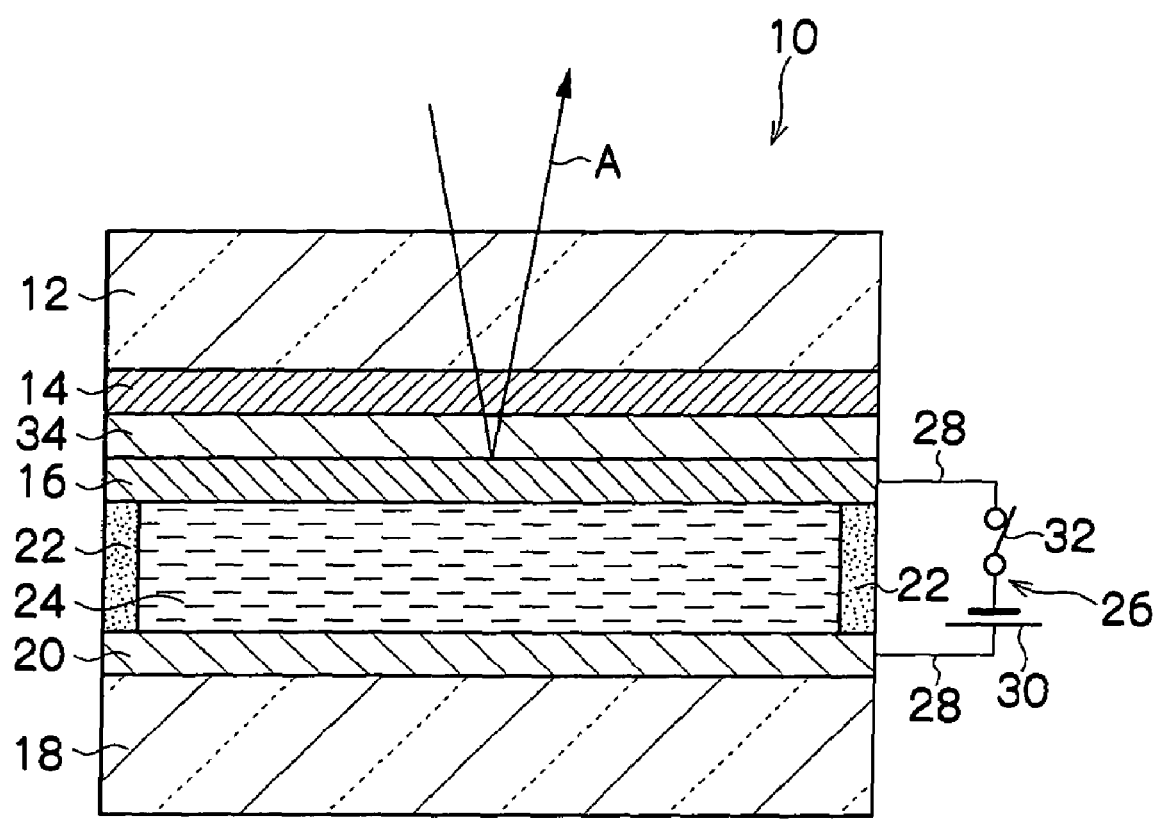
FIG. 1 is a cross-sectional view illustrating the overall configuration of a variable reflectance mirror according to the first embodiment of the invention.

Hereinafter, the variable reflectance mirror according to the present invention will be described in detail.
First Embodiment
FIG. 1 is a cross-sectional view illustrating the overall configuration of a variable reflectance mirror 10 according to the first embodiment of the invention.

The variable reflectance mirror 10 has a glass substrate 12 as its transparent substrate. A color layer 14 that develops color by binding to hydrogen or lithium is formed as a thin layer on the rear surface of the glass substrate 12 (bottom surface in FIG. 1), for example, by means of vacuum deposition. In the first embodiment, the material used for the color layer 14 is tungsten trioxide ($WO_3$).

Further, a light-reflecting layer 16 that permits transmission of hydrogen or lithium is formed as a thin layer on the surface of the color layer 14 that is opposite to the surface on which the glass substrate 12 is formed, by means of, for example, vacuum deposition. In the first embodiment, the material used for the light-reflecting layer 16 is rhodium.

Another glass substrate 18 is placed close to the rear surface of the glass substrate 12. A thin layer electrode layer 20 is formed on the surface of the glass substrate 18 (surface facing the glass substrate 12) as a supplying device, for example, by means of vacuum deposition. In the first embodiment, the material used for the electrode layer 20 is chromium or the like.

Further, a space sealed by a peripheral sealant 22 (a cell structure) is formed between the light-reflecting layer 16 of glass substrate 12 and the electrode layer 20 of the glass substrate 18, and an electrolytic solution 24 is enlosed into the cell as a supplying device. In the first embodiment, the electrolytic solution 24 has a propylene carbonate as the solvent and contains sulfuric acid ($H_2SO_4$) as a hydrogen ion source, and a neutral material, ferrocene [$Fe(C_5H_5)_2$] as a oxidizing agent.

Further, as a supplying device, a power supply unit 26 is connected to the light-reflecting layer 16 of glass substrate 12 and to the electrode layer 20 of glass substrate 18 via wiring 28. The power supply unit 26 has a direct current power supply 30 and a switch 32; and when the switch 32 is turned "ON", the minus electrode of the direct current power supply 30 is connected to the light-reflecting layer 16 and the plus electrode of direct current power supply 30 to the electrode layer 20. The light-reflecting layer 16 and the electrode layer 20 may be short-circuited via a circuit (not shown).

Figure 2:
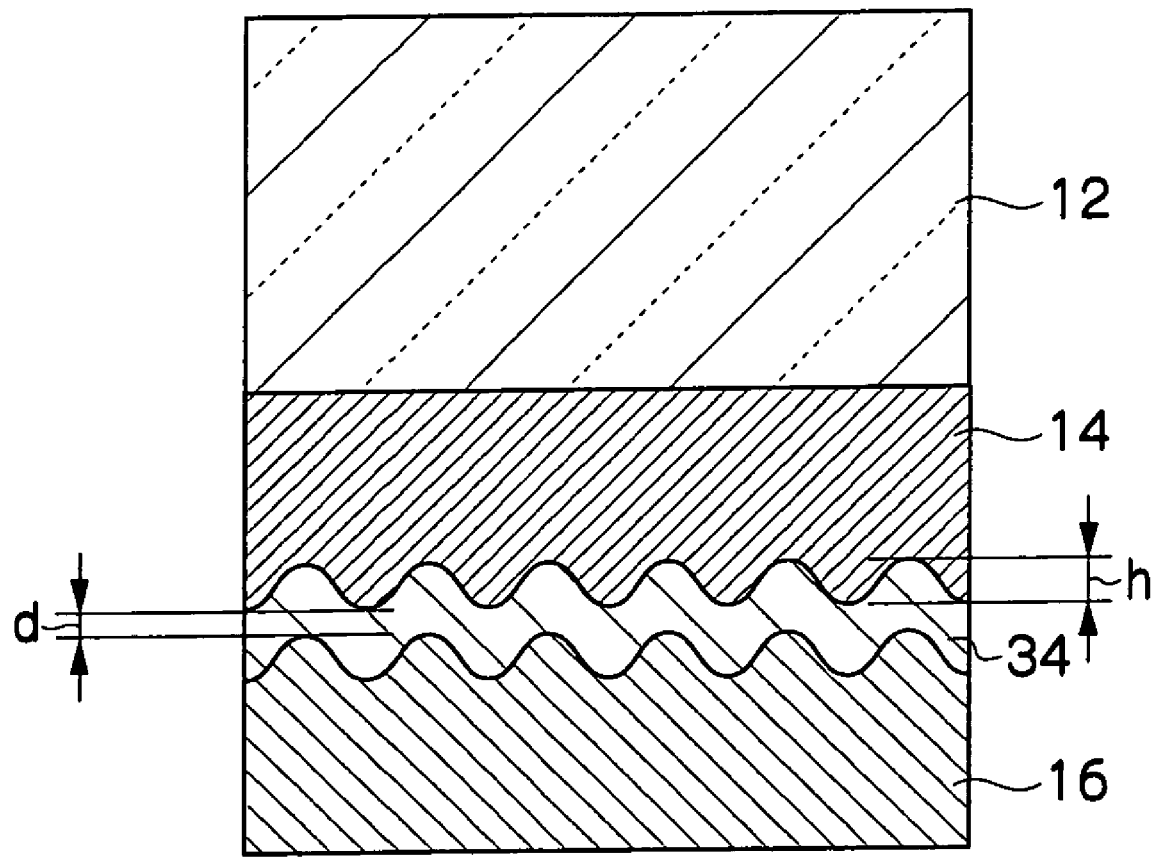
FIG. 2 is a cross-sectional view illustrating a partial configuration of the variable reflectance mirror according to the first embodiment of the invention.

As shown in FIG. 2, in the variable reflectance mirror 10 according to the first embodiment, a transparent intermediate layer 34 permitting transmission of hydrogen or lithium and having a refractive index smaller than that of the color layer 14 is formed as a thin layer between the color layer 14 and the light-reflecting layer 16, by means of, for example vacuum deposition. In the first embodiment, the material used for the intermediate layer 34 is lithium fluoride.

In such a case, the refractive index of the lithium fluoride intermediate layer 34 is 1.4; and because the refractive index of the tungsten trioxide color layer 14 is approximately 2, the refractive index of the intermediate layer 34 is sufficiently smaller than the refractive index of color layer 14.

In addition, in the variable reflectance mirror 10 according to the first embodiment, the thickness of the color layer 14 is typically about 500 nm, and the depth h of the irregularities of the surface thereof (surface opposite to the glass substrate 12) is typically about 10 nm. The thickness of the light-reflecting layer 16 is typically about 50 nm, and the thickness d of the intermediate layer 34 is typically about 10 nm.

Figure 3:
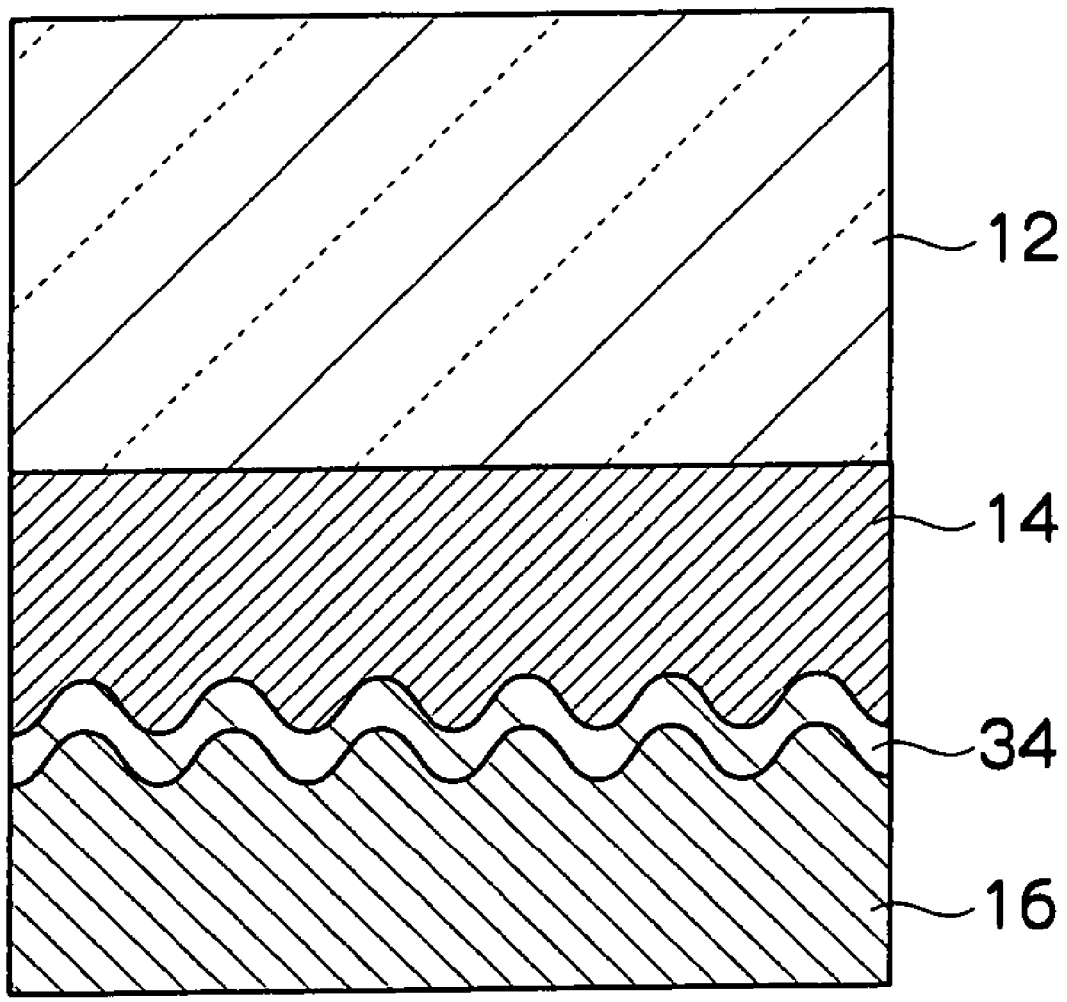
FIG. 3 is a cross-sectional view illustrating a partial configuration of a modification of the variable reflectance mirror according to the first embodiment of the invention.

The thickness "d" of the intermediate layer 34 is a distance in the thickness direction of the glass substrate 12 between the summit of the irregularities of color layer 14 surface (the lowest edge of the irregularities in FIG. 2) and the summit of the irregularities of light-reflecting layer 16 surface (the highest edge of the irregularities in FIG. 2). Accordingly, for example the thickness d of intermediate layer 34 may be set to 0 or less, as shown in FIG. 3.

Hereinafter, the operation of the configuration of the first embodiment will be described.

In the variable reflectance mirror 10 having the configuration above, when the switch 32 of the power supply unit 26 is turned "ON", a negative voltage is applied to the light-reflecting layer 16 and a positive voltage to the electrode layer 20 by the direct current power supply 30. The hydrogen ions contained in the electrolytic solution 24 are converted to hydrogen atoms at the light-reflecting layer 16, which diffuse though the light-reflecting layer 16 to the color layer 14. As a result, the following reductive reaction occurs in the color layer 14.

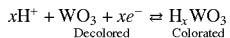

In the equation reaction above, $H^+$ represents a hydrogen ion; x represents a number in a range of 0 to 0.3; and $e^-$ represents an electron.

At this time, the following oxidation reaction occurs in the electrolytic solution 24 close to the electrode layer 20.

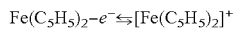

Thus, the reaction can be represented overall by the following equation.

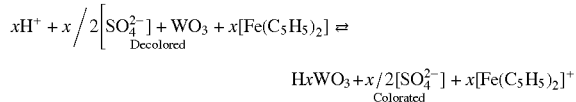

Tungsten trioxide ($WO_3$), that is a material for the color layer 14, develops color in accordance with the reaction of the above equation. The light that enters from the surface of the glass substrate 12 into the glass substrate 12 and is reflected by the light-reflecting layer 16 (see arrow A in FIG. 1) is reduced in intensity by passing through the colored color layer 14, altering the reflectance of the variable reflectance mirror 10 and making it exert an anti-glare effect.

On the other hand, when the switch 32 of the power supply unit 26 is turned "OFF", i.e., when the voltage applied to the light-reflecting layer 16 and the electrode layer 20 is removed and the light-reflecting layer 16 and the electrode layer 20 are short-circuited via a circuit (not shown), the hydrogen atoms diffused into the color layer 14 are converted to hydrogen ions in the light-reflecting layer 16 and conveyed back to the electrolytic solution 24, making the tungsten trioxide ($WO_3$) material of the color layer 14 decolor.

In the variable reflectance mirror 10 according to the first embodiment, a lithium fluoride intermediate layer 34 having a refractive index significantly smaller than that of the color layer 14 is formed between the tungsten trioxide color layer 14 and the rhodium light-reflecting layer 16. Presence of the layer, which makes the color layer 14 and the light-reflecting layer 16 boundary distinct, allows prevention or control of the deterioration in reflectance when the color layer 14 has been decolored.

Figure 4:
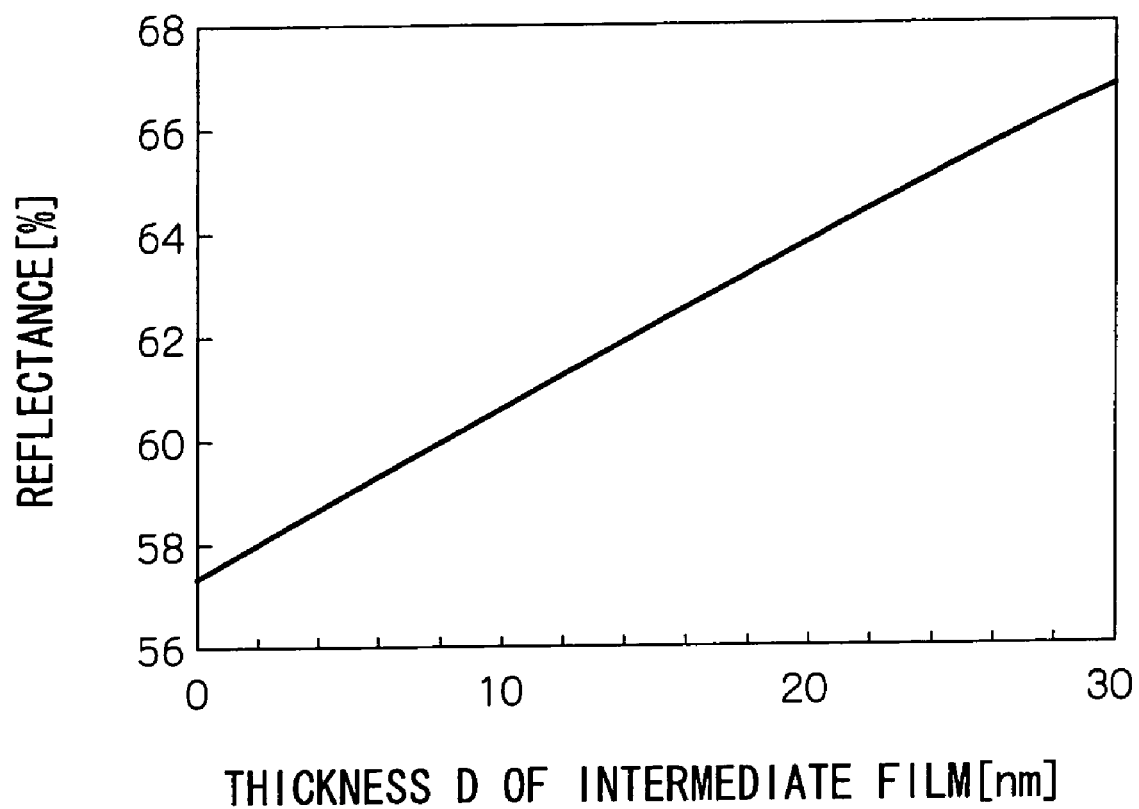
FIG. 4 is a chart showing the theoretical relationship between the thickness of intermediate layer and the reflectance of the variable reflectance mirror according to the first embodiment of the invention.

FIG. 4 is a chart showing the theoretical relationship between the thickness d of intermediate layer 34 and the reflectance when the color layer 14 has been decolored in the variable reflectance mirror 10 according to the first embodiment, when the thickness of the tungsten trioxide color layer 14 is set to about 500 nm, the depth h of the irregularities of the color layer 14 surface is set to 10 nm, and the thickness of the rhodium light-reflecting layer 16 is set to 50 nm.

As is apparent from FIG. 4, in the variable reflectance mirror 10 according to the first embodiment having a lithium fluoride intermediate layer 34 having a thickness d of about 10 nm, the reflectance exceeds approximately 60% when the color layer 14 has been decolored, indicating that advantageous effects of the intermediate layer 34 are sufficiently exerted.

In addition, FIG. 4 demonstrates that the reflectance when the color layer 14 has been decolored is increased to approximately 64% when, for example, the thickness d of the intermediate layer 34 becomes approximately 20 rm and it is possible to improve the reflectance when the color layer 14 has been decolored by increasing the thickness d of intermediate layer 34. However, an excessively large thickness d of the intermediate layer 34 may result in generation of interference colors; and thus the thickness d of intermediate layer 34 is preferably set to about 100 nm or less.

As described above, the variable reflectance mirror 10 according to the first embodiment allows prevention or control of the deterioration in reflectance when the color layer 14 has been decolored.

Although the electrolytic solution 24 for the explanation of the first embodiment contains hydrogen ions, the electrolyte contained in the electrolytic solution 24 is not limited to hydrogen atoms and may be a configuration with lithium ions.

Second Embodiment

Hereinafter, the second embodiment of the invention will be described. For elimination of duplicated description, codes identical with those in the first embodiment are assigned to structures and effects which are basically the same as those of the first embodiment.

Figure 5:
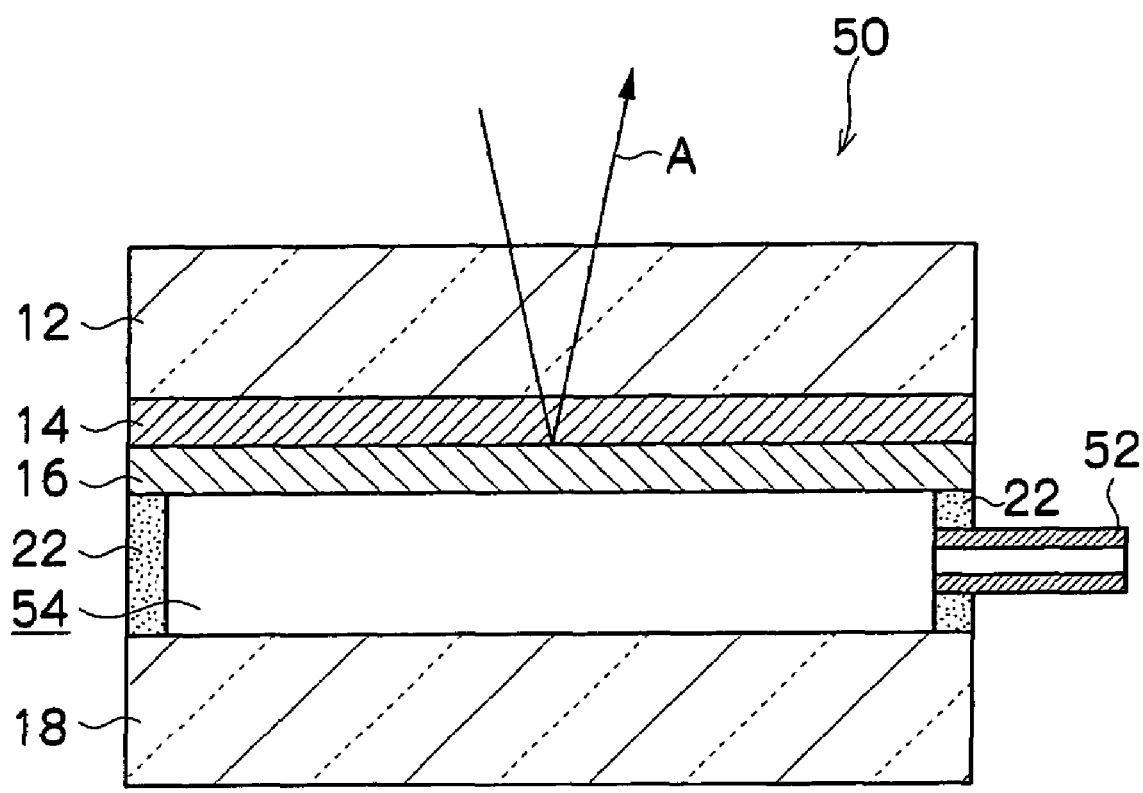
FIG. 5 is a cross-sectional view illustrating the overall configuration of a variable reflectance mirror according to the second embodiment of the invention.
Figure 6:
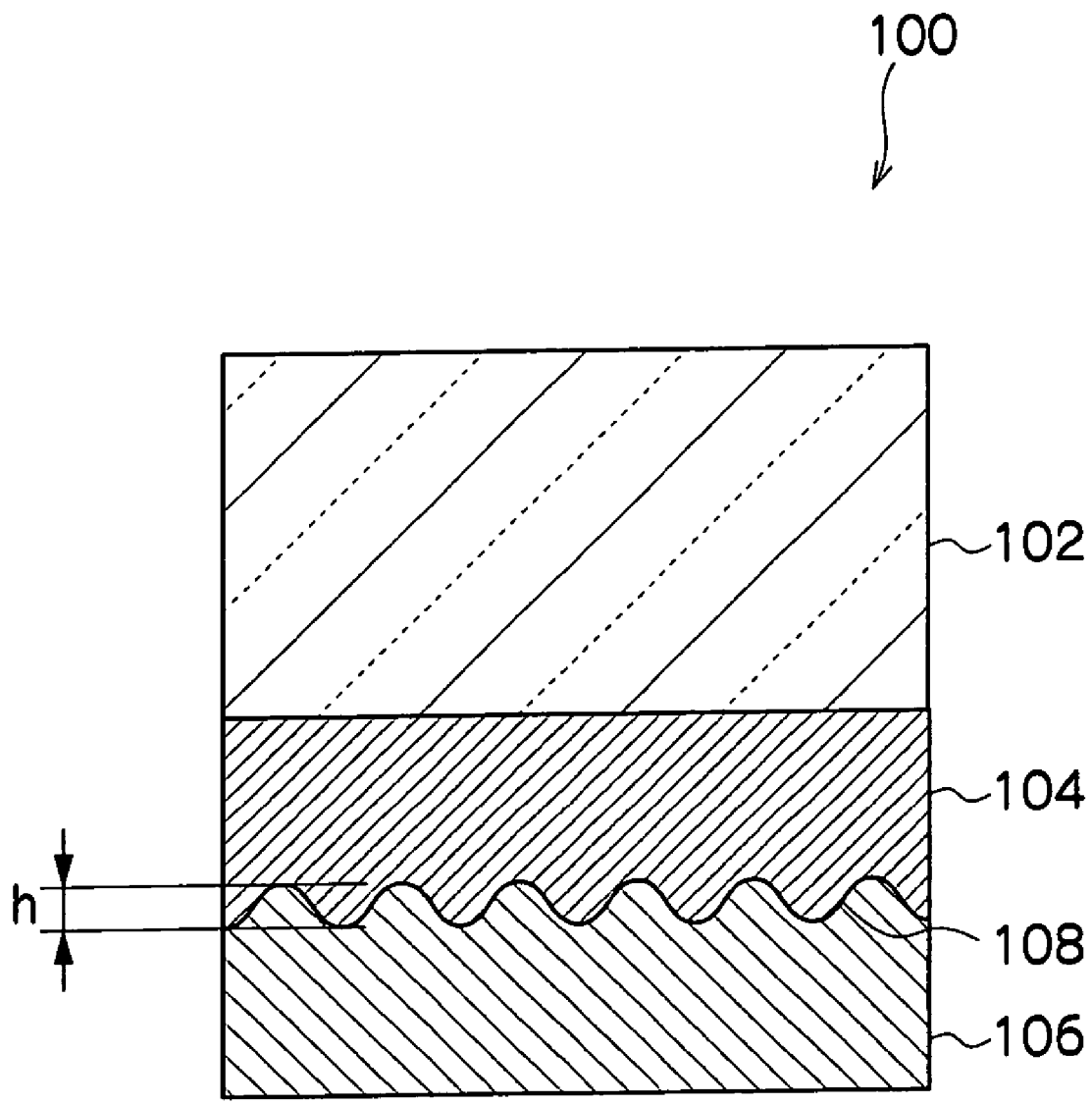
FIG. 6 is a cross-sectional view illustrating a partial configuration of a conventional variable reflectance mirror.
Figure 7:
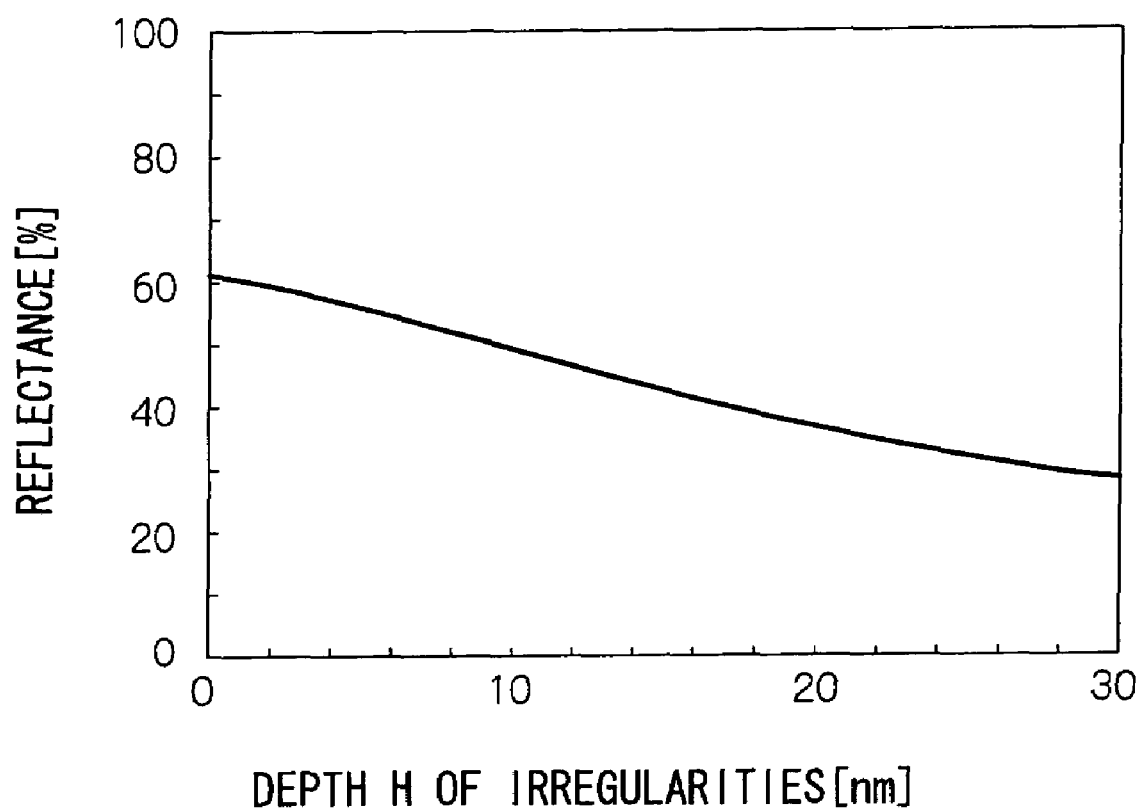
FIG. 7 is a chart showing the theoretical relationship between the depth of irregularities of the interface between the color layer and the light-reflecting layer and the reflectance of a conventional variable reflectance mirror.

FIG. 5 is a cross-sectional view illustrating the overall configuration of a variable reflectance mirror 50 according to the second embodiment.

The variable reflectance mirror 50 has a configuration that is basically the same as the variable reflectance mirror 10 according to the first embodiment, except that the variable reflectance mirror 10 has a supplying device which is different from those in the first embodiment. Namely, the variable reflectance mirror 50 does not have the electrode layer 20, electrolytic solution 24, and power supply unit 26 according to the first embodiment as supplying device, but instead has an inlet 52 for introducing a gas at one part of the peripheral sealant 22 as the supplying device.

The inlet 52 is connected to a gas supply apparatus (not shown in the Figure) as the supplying device. The gas supply apparatus supplies or discharges via the inlet 52 into and out of the cell 54 as supplying device a mixture gas of: an inert gas such as argon or the like mixed with hydrogen gas; and an oxygen-containing gas, or the like.

The other components of the variable reflectance mirror 10 are the same as those of the variable reflectance mirror 10 according to the first embodiment, and as is shown in FIG. 2, a lithium fluoride intermediate layer 34 is formed between the tungsten trioxide color layer 14 and the rhodium light-reflecting layer 16.

The operation of the configuration of the the second embodiment will be described below.

In the variable reflectance mirror 50 having the configuration above, when a hydrogen gas-containing inert gas is introduced via the inlet 52 into the cell 54 from the gas supply apparatus, the hydrogen gas contained in the inert gas is decomposed to hydrogen atoms at the rhodium light-reflecting layer 16, which then diffuse through the rhodium light-reflecting layer 16 to the color layer 14, and color the color layer 14. Thus, the reflectance of the mirror decreases.

Alternatively, when the hydrogen gas-containing inert gas is discharged from the cell 54 and an oxygen-containing gas is introduced into the cell 54 by the gas supply apparatus, hydrogen atoms bound to the color layer 14 are oxidized by the oxygen, decoloring the color layer 14 back into the original state.

A lithium fluoride intermediate layer 34 is formed between the tungsten trioxide color layer 14 and the rhodium light-reflecting layer 16 also in the variable reflectance mirror 50. Accordingly, in a similar manner to the variable reflectance mirror 10 according to the first embodiment, presence of the intermediate layer 34, which makes the color layer 14 and the light-reflecting layer 16 boundary distinct, allows prevention or control of the deterioration in reflectance when the color layer 14 has been decolored.

As described above, the variable reflectance mirror 50 according to the second embodiment has advantageous effects fundamentally similar to the variable reflectance mirror 50 according to the first embodiment, and thus allows prevention or control of the deterioration in reflectance when the color layer 14 has been decolored.

The material used for the intermediate layer 34 is lithium fluoride in the first and the second embodiments, but the material used for the intermediate layer 34 is not limited to lithium fluoride, and silicon dioxide, magnesium fluoride, calcium fluoride, or the like may be used instead.

What is claimed is:

1. A variable reflectance mirror, comprising:
   a color layer that can develop color by binding with hydrogen or lithium;
   a transparent substrate having one surface formed directly in contact with one surface of the color layer, and an opposite surface that contacts ambient air;
   a light-reflecting layer formed on the side of the color layer opposite to the surface thereof on which the transparent substrate is in direct contact with, which allows transmission of hydrogen or lithium; and
   a supplying device for supplying hydrogen or lithium to the color layer,
   wherein a transparent intermediate layer, which allows transmission of hydrogen or lithium and which has a refractive index smaller than that of the color layer, is formed between the color layer and the light-reflecting layer to increase the reflectivity of the resulting variable reflectance mirror, said layer having one surface in direct contact with the side of the color layer opposite to the surface thereof on which the transparent substrate is in direct contact with, and an opposite surface in direct contact with said light-reflecting layer.

2. The variable reflectance mirror according to claim 1, wherein the material used for the intermediate layer is selected from the group consisting of silicon dioxide, magnesium fluoride, lithium fluoride, and calcium fluoride.

3. The variable reflectance mirror according to claim 1, wherein the thickness of the intermediate layer is 100 nm or less.

4. The variable reflectance mirror according to claim 2, wherein the thickness of the intermediate layer is 100 nm or less.

5. The variable reflectance mirror according to claim 1, wherein: the color layer develops color by binding with hydrogen; the light-reflecting layer allows permeation of hydrogen; and the supplying device supplies hydrogen to the color layer.

6. The variable reflectance mirror according to claim 1, wherein: the color layer develops color by binding with lithium; the light-reflecting layer allows permeation of lithium; and the supplying device supplies lithium to the color layer.

7. The variable reflectance mirror according to claim 1, wherein the supplying device includes an electrode layer, a cell structure containing an electrolytic fluid, and a power supply unit.

8. The variable reflectance mirror according to claim 7, wherein the supplying device is connected to an apparatus for supplying a gas containing hydrogen to the cell structure.

9. The variable reflectance mirror according to claim 8, wherein the cell structure contains a liquid electrolytic solution.

10. The variable reflectance mirror according to claim 1, wherein the thickness of the intermediate layer is less than 15 nm.

11. The variable reflectance mirror according to claim 1, wherein the thickness of the intermediate layer is about 10 nm.

12. The variable reflectance mirror according to claim 1, wherein both the color layer and the light-reflecting layer have surface irregularities, and wherein the thickness of the intermediate layer is selected to be a distance between the highest and lowest edges of the irregularities.

13. A variable reflectance mirror, comprising:
   a color layer that can develop color by binding with hydrogen or lithium;
   a transparent substrate having one surface formed directly in contact with one surface of the color layer, and an opposite surface that contacts ambient air;
   a light-reflecting layer formed on the side of the color layer opposite to the surface thereof on which the transparent substrate is in direct contact with, which allows transmission of hydrogen or lithium; and
   a supplying device for supplying hydrogen or lithium to the color layer including an electrode layer, a cell structure containing an electrolytic fluid, and a power supply unit,
      wherein a transparent intermediate layer having a thickness of less than 15 nm,
      which allows transmission of hydrogen or lithium and having a refractive index smaller than that of the color layer, is formed between the color layer and the light-reflecting layer to increase the reflectivity of the resulting variable reflectance mirror, and has one surface in direct contact with the side of the color layer opposite to the surface thereof on which the transparent substrate is in direct contact with, and an opposite surface in direct contact with said light-reflecting layer.

14. A method for making variable reflectance mirror that comprises the steps of:
   providing a color layer that can develop color by binding with hydrogen or lithium;
   forming one surface of a transparent substrate directly in contact with one surface of the color layer;
   forming a light-reflecting layer which allows transmission of hydrogen or lithium on the side of the color layer opposite to the surface thereof on which the transparent substrate is formed;
   providing a supplying device for supplying hydrogen or lithium to the color layer that includes a cell structure containing an electrolytic fluid, and
   forming a transparent intermediate layer, which allows transmission of hydrogen or lithium and having a refractive index smaller than that of the color layer, between the color layer and the light-reflecting layer one surface in direct contact with the side of the color layer opposite to the surface thereof on which the transparent substrate is in direct contact with, and an opposite surface in direct contact with said light-reflecting layer,
   wherein both the color layer and the light-reflecting layer have microscopic undulating surface irregularities which are substantially uniform, and wherein a thickness of the intermediate layer is selected to be a distance between the highest and lowest edges of the irregularities.

* * * * *